(12) United States Patent
Trivelpiece et al.

(10) Patent No.: US 11,449,693 B2
(45) Date of Patent: *Sep. 20, 2022

(54) SYSTEMS AND METHODS FOR LOCATING TAGS

(71) Applicant: SENSORMATIC ELECTRONICS, LLC, Boca Raton, FL (US)

(72) Inventors: Steve E. Trivelpiece, Rancho Santa Margarita, CA (US); Eric F. Riggert, Trabuco Canyon, CA (US); Edward McCauley, Milton, GA (US); Glen Ouellette, Huntington Beach, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,181

(22) Filed: Dec. 7, 2020

(65) Prior Publication Data
US 2021/0089732 A1 Mar. 25, 2021

Related U.S. Application Data

(63) Continuation of application No. 16/339,033, filed as application No. PCT/US2017/055233 on Oct. 5, 2017, now Pat. No. 10,860,817.
(Continued)

(51) Int. Cl.
*G06K 7/10* (2006.01)
*G01S 13/75* (2006.01)
*G01S 13/87* (2006.01)

(52) U.S. Cl.
CPC .......... *G06K 7/10366* (2013.01); *G01S 13/75* (2013.01); *G01S 13/878* (2013.01)

(58) Field of Classification Search
CPC .......... G06K 7/10366; G06K 7/10376; G01S 13/75; G01S 13/878
(Continued)

(56) References Cited

U.S. PATENT DOCUMENTS 9,195,866 B1 * 11/2015 Mehranfar ............. G06Q 10/06
9,373,014 B1 * 6/2016 Mehranfar ............. G05D 1/104
(Continued)

FOREIGN PATENT DOCUMENTS

| EP | 2779020 A2 | 9/2014 |
| EP | 2955541 A1 | 12/2015 |
| WO | 2015190975 A1 | 12/2015 |

OTHER PUBLICATIONS

International Search Report and Written Opinion issued in corresponding International Application No. PCT/US2017/055233 dated May 5, 2018.

*Primary Examiner* — Paultep Savusdiphol
(74) *Attorney, Agent, or Firm* — ArentFox Schiff LLP

(57) ABSTRACT

Systems and methods for determining a physical location of a first Radio Frequency Identification ("RFID") tag. The methods involve: analyzing timestamped tag read information acquired during multiple tag reads to determine a first physical location for the first RFID tag read by the mobile reader while moving through a facility; identifying second RFID tags from a plurality of RFID tags read by the mobile reader that are located in proximity to the first RFID tag and that are coupled to objects similar to an object to which the first RFID tag is coupled; selecting an RFID tag from the second RFID tags that has a first location confidence value associated therewith which is greater than second location confidence values associated with other RFID tags of the second RFID tags; and modifying the first physical location based on a second physical location of the RFID tag selected from the second RFID tags.

18 Claims, 10 Drawing Sheets

Related U.S. Application Data

(60) Provisional application No. 62/404,340, filed on Oct. 5, 2016.

(58) Field of Classification Search
USPC .................................................. 235/451, 492
See application file for complete search history.

(56) References Cited

U.S. PATENT DOCUMENTS

| | | | |
|---|---|---|---|
| 9,411,997 B1* | 8/2016 | Mehranfar | G08B 27/001 |
| 2006/0170565 A1* | 8/2006 | Husak | G06K 7/0008 |
| | | | 340/8.1 |
| 2013/0169415 A1* | 7/2013 | Bellows | G01S 5/0284 |
| | | | 340/10.1 |
| 2015/0362581 A1 | 12/2015 | Friedman et al. | |
| 2015/0363616 A1* | 12/2015 | Kumar | G06K 7/10386 |
| | | | 340/8.1 |

* cited by examiner

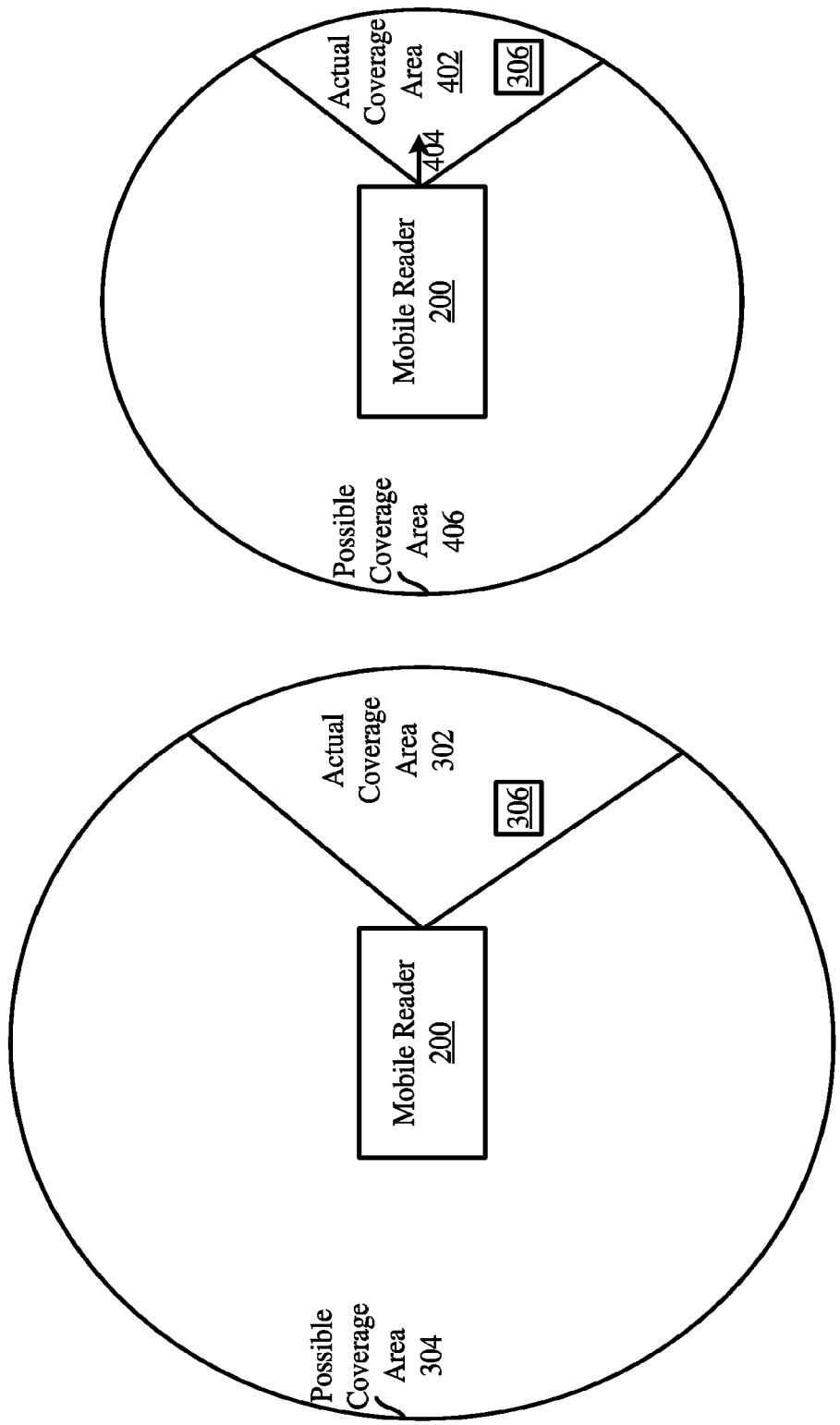

SYSTEMS AND METHODS FOR LOCATING TAGS

CROSS-REFERENCE TO RELATED APPLICATIONS

This application is a continuation of prior U.S. patent application Ser. No. 16/339,033, filed on Apr. 3, 2019, which is a national stage of international application PCT/US2017/055233, filed on Oct. 5, 2017, and which claims the benefit of U.S. Provisional Ser. No. 62/404,340 filed Oct. 5, 2016, the entirety of each of which is incorporated herein by reference in its entirety.

BACKGROUND

Statement of the Technical Field

The present disclosure relates generally to Radio Frequency Identification ("RFID") systems. More particularly, the present disclosure relates to implementing systems and methods for locating tags in RFID systems.

Description of the Related Art

Retailers are adding more RFID tags to their products to track inventory. However, the total number of products on a store floor constantly changes as products are sold and restocked. Putting RFID readers at the transition areas of the store floor and at the Point Of Sale ("POS") stations would work well if 100% of the RFID tags were correctly read. However, in practice only 60-98% of the RFID tags are read at each transition area. This means that the inventory process is not 100% accurate. In addition, products are removed from the store by thieves without the RFID tags being read.

The ideal technical solution is to have hundreds of fixed RFID readers placed around the retail store. However, this is too expensive to implement. The best alternative is to use handheld readers to track inventory. However, this handheld inventorying process is very time consuming, human resource intensive and costly. Thus, the handheld inventorying process is typically performed monthly. Additionally, the handheld inventorying process is error prone due to employee mistakes.

SUMMARY

The present document concerns systems and methods for determining a physical location of a first Radio Frequency Identification ("RFID") tag. The methods comprise analyzing timestamped tag read information acquired during multiple tag reads to determine a first physical location for the first RFID tag read by the mobile reader while moving through a facility. Each of the multiple tag reads are performed when the mobile reader is at a respective one of a plurality of different locations within the facility. The mobile reader has the same or different RF power level setting at each one of the different locations.

Next, second RFID tags are identified from a plurality of RFID tags read by the mobile reader that are located in proximity to the first RFID tag and that are coupled to objects similar to an object to which the first RFID tag is coupled. An RFID tag is selected from the second RFID tags that has a first location confidence value associated therewith which is greater than second location confidence values associated with other RFID tags of the second RFID tags. The first physical location is modified based on a second physical location of the RFID tag selected from the second RFID tags. A third location confidence value associated with the first RFID may also be increased by an amount selected based on at least one of (a) how much the first physical location was modified, (b) the first location confidence value associated with the RFID tag selected from the second RFID tags, and (c) a degree of similarity between an object to which the first RFID tag is coupled and an object to which the RFID tag selected from the second RFID tags is coupled.

A graphical map can be generated that shows the first physical location of the first RFID tag in a virtual space representing the facility. The graphical map comprises a human readable name for a geographic area in which the first RFID tag resides. The human readable name is determined by translating a read code (e.g., a product identification code or a symbol sequence (e.g., a number) which can be used to acquire the product identification code from a data store) into the human readable name. The translating is performed by the mobile reader without any manual input from a user.

BRIEF DESCRIPTION OF THE DRAWINGS

Embodiments will be described with reference to the following drawing figures, in which like numerals represent like items throughout the figures.

FIG. 3 is an illustration that is useful for understanding a mobile reader's coverage area.

FIG. 4 is an illustration that is useful for understanding how knowledge of a mobile reader's pointing direction can facilitate tag location.

DETAILED DESCRIPTION

Figure 1:
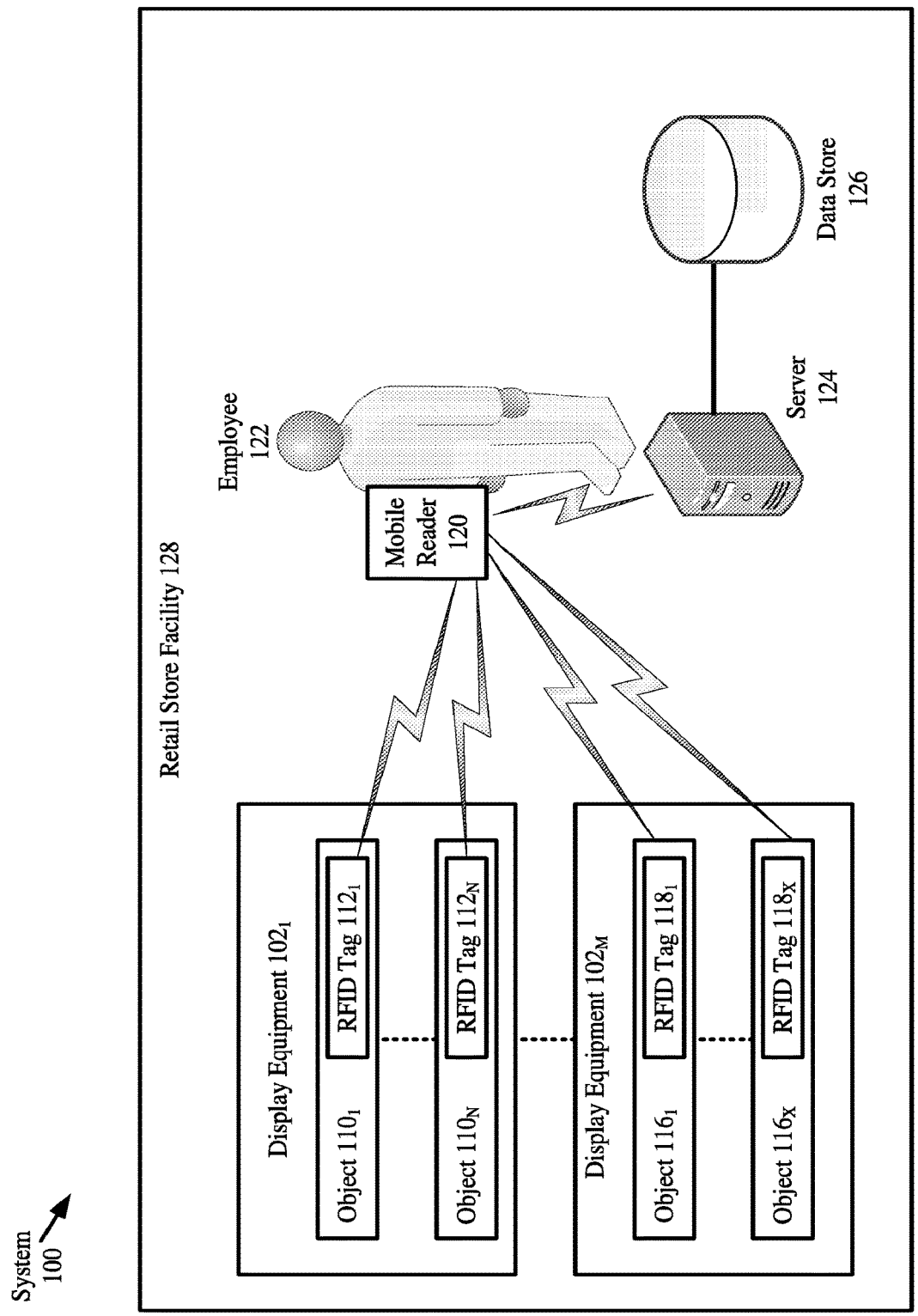
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Presently, there is a desire to take advantage of normal operations in retail stores to do inventory readings using mobile readers. The mobile readers can include, but are not limited to, handheld RFID readers, robotic RFID readers (e.g., readers disposed on an Unmanned Ground Vehicle ("UGV") or an Unmanned Aerial Vehicle ("UAV")), and/or RFID readers capable of being attached to, coupled to or worn by individuals (e.g., store employees). The present solution involves adding a location tracking feature to the mobile readers. The mobile readers are then used in a manner that ensures enough data points are obtained to facilitate a highly accurate inventorying process.

For example, mobile RFID readers are attached or coupled to store employees such that RFID tag reads are performed while the store employees restock shelves, clean the facility, conduct security activities, and/or assist customers. In this case, ecommerce orders can be prepared for shipping or pick-up relatively quickly since store employees can find where the purchased products reside in the retail store with a relatively high degree of accuracy.

Today, it often takes 1-15 minutes for a product to be located in a retail store. This is not the case when employing the present solution. While a store employee uses the improved mobile reader of the present solution to find the purchased products in the retail store, the mobile reader logs the location of every tag read thereby. This location information is then used to update a tag location database so that it has close to real-time accuracy. In addition, advanced algorithms are employed to improve the accuracy of the location information stored in the tag location database. For example, the accuracy of a given tag's location can be improved using the locations of neighbor tags.

The present solution as disclosed herein utilizes inventive algorithms to accomplish at least the following objectives: improving the accuracy of a mobile reader so that its location and pointing direction are known in 3D space; mapping a tag read onto a graphical 3D store map so that individuals can visualize where in the facility the tag is located; providing wearable tag readers to employees and adding tag readers to store equipment so that tags are read during normal business processes; and taking advantage of the tag reads performed while the employees are searching for products that need to be located to fulfill online ecommerce orders. Power cycling can be used to improve the location accuracy of tags that are read.

The present solution also advantageously provides methods to auto configure an RFID tag system in a facility (e.g., a retail store) with very limited fixed infrastructure. The present solution improves fixed location tag micro-location, and can be used with high accuracy mobile tag readers that know their locations in 3D space without use of stationary location tags or location beacons. The present solution also includes algorithms and analytic logic to associate neighbor nodes with each other and dynamically adjust power levels of the tag readers so as to facilitate highly accurate tag location determinations with minimal hardware and/or software modifications.

Illustrative Systems

Referring now to FIG. 1, there is provided a schematic illustration of an exemplary system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow improved object and/or item locating within a facility. As shown in FIG. 1, system 100 comprises a Retail Store Facility ("RSF") 128 in which display equipment $102_1, \ldots, 102_M$ is disposed. The display equipment is provided for displaying objects (or items) $110_1$-$110_N$, $116_1$-$116_X$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein.

At least one mobile reader 120 is provided to assist in locating an object $110_1$-$110_N$, $116_1$-$116_X$ within the RSF 128. The mobile reader 120 comprises a handheld RFID reader capable of being carried by an individual (or store employee) 122 or an RFID reader capable of being attached or coupled to the individual 122. The present solution is not limited in this regard. In other scenarios, the mobile reader 120 comprises a robotic RFID reader.

As shown in FIG. 1, RFID tags $112_1$-$112_N$, $118_1$-$118_X$ are respectively attached or coupled to the objects $110_1$-$110_N$, $116_1$-$116_X$ (e.g., pieces of clothing or other merchandise). The mobile reader 120 is generally configured to read RFID tags $112_1, \ldots, 112_N$, $118_1, \ldots, 118_X$. The RFID tags are described herein as comprising single-technology tags that are only RFID enabled. The present solution is not limited in this regard. The RFID tags can alternatively or additionally comprise dual-technology tags that have both EAS and RFID capabilities. Also, the RFID tags can be replaced with EAS tags having a communications means other than RFID.

Notably, the mobile reader 120 is configured to determine and track its location within the RSF 128 as it is being moved about therein. By correlating the mobile reader's RFID tag reads and locations within the RSF 128, it is possible to determine the location of objects $110_1, \ldots, 110_N$, $116_1, \ldots, 116_X$ within the RSF 128 with a relatively high degree of accuracy. Accordingly, RFID tag read information and mobile reader location information is stored in a data store 126. This information can be stored in the data store 126 using a server 124. Server 124 will be described in more detail below in relation to FIG. 7.

In some scenarios, the mobile reader 120 operates in a static configuration. The operator sets the power and other RFID parameters before reading tags for inventorying the same. The whole inventory of tags is performed with the configuration set at the start of the inventorying process.

In other scenarios, the mobile reader 120 operates in a dynamic configuration. The mobile reader 120 dynamically adapts its parameters based on whether or not it is present within an Area Of Interest ("AOI"). The AOI is selected from a plurality of separate areas defined within the RSF 128. The separate areas can be identified based on RFID tag groupings.

The RFID tags can be assigned to groups based on their product identification codes (e.g., Stock Keeping Unit ("SKU") numbers) and/or relative locations within the RSF 128. For example, the mobile reader 120 reads an RFID tag $112_1$ to acquire its SKU number. The SKU number is then translated into a human readable name (e.g., men's shoe size 7). An algorithm and/or look-up table can be used to achieve this translation. Operations are then performed to identify other RFID tags that are located in proximity to (or within a distance range (e.g., <10 feet in one or more directions) from) the read RFID tag. The identified RFID tags are then deemed to be attached to items of the same or similar type (e.g., men's shoes of various sizes) as that to which the read RFID tag is attached. The geographic area in which this group of RFID tags reside is then assigned a general human readable name (e.g., men's shoes). This geographic area may constitute an AOI.

A map can be generated and displayed by the mobile reader 120 to assist an individual in traveling to an AOI within the RSF 128. In this regard, the map can comprise visual lines designating separate geographic areas within the RSF and corresponding text representing the general human readable names associated therewith.

Figure 2:
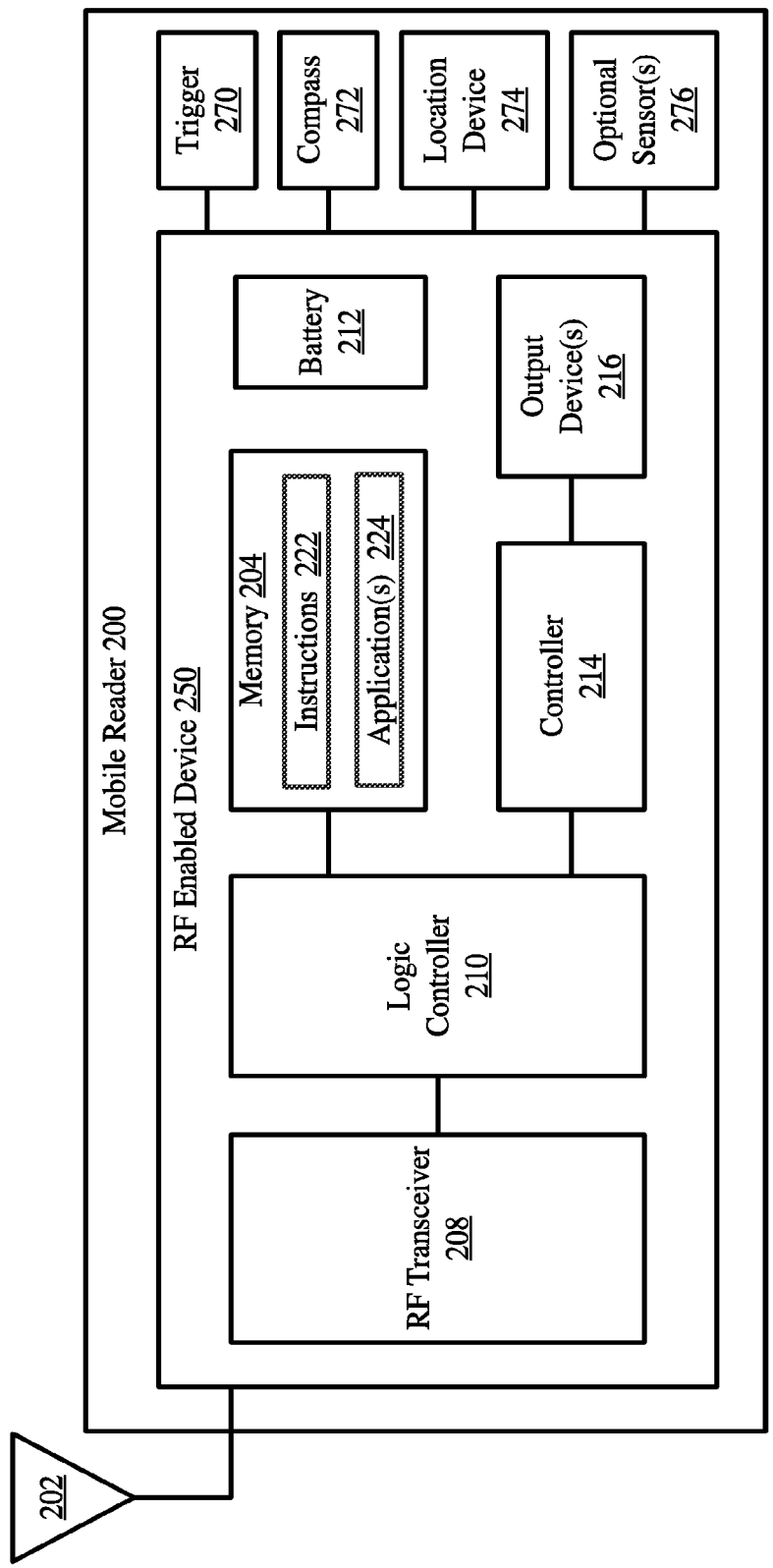
FIG. 2 is an illustration of an illustrative mobile reader.

Referring now to FIG. 2, there is provided a detailed block diagram of an illustrative mobile reader 200. Mobile reader 120 of FIG. 1 is the same as or similar to mobile reader 200. As such, the discussion of mobile reader 200 is sufficient for understanding mobile reader 120.

Mobile reader 200 may include more or less components than that shown in FIG. 2. However, the components shown are sufficient to disclose an illustrative embodiment implementing the present solution. Some or all of the components of the mobile reader 200 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 2 represents an embodiment of a representative mobile reader 200 configured to facilitate improved object locating within an RSF (e.g., RSF 128 of FIG. 1). In this regard, the mobile reader 200 comprises an RF enabled device 250 for allowing data to be exchanged with an external device (e.g., RFID tags $112_1, \ldots, 112_N, 118_1, \ldots, 118_X$ of FIG. 1) via RF technology. The components 204-216 shown in FIG. 2 may be collectively referred to herein as the RF enabled device 250, and include a power source 212 (e.g., a battery).

The RF enabled device 250 comprises an antenna 202 for allowing data to be exchanged with the external device via RF technology (e.g., RFID technology or other RF based technology). The external device may comprise RFID tags $112_1, \ldots, 112_N, 118_1, \ldots, 118_X$ of FIG. 1. In this case, the antenna 202 is configured to transmit RF carrier signals (e.g., interrogation signals) to the listed external devices, and/or transmit data response signals (e.g., authentication reply signals) generated by the RF enabled device 250. In this regard, the RF enabled device 250 comprises an RF transceiver 208. RFID transceivers are well known in the art, and therefore will not be described herein. However, it should be understood that the RF transceiver 208 receives RF signals including information from the transmitting device, and forwards the same to a logic controller 210 for extracting the information therefrom.

The extracted information can be used to determine the location of RFID tags within a facility (e.g., RSF 128 of FIG. 1). Accordingly, the logic controller 210 can store the extracted information in memory 204, and execute algorithms using the extracted information. For example, the logic controller 210 can perform operations to correlate its own tag reads with tag reads made by other tag readers (static or mobile) to determine the location of the RFID tags within the facility.

Notably, memory 204 may be a volatile memory and/or a non-volatile memory. For example, the memory 204 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 204 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 222 are stored in memory for execution by the RF enabled device 250 and that cause the RF enabled device 250 to perform any one or more of the methodologies of the present disclosure. The instructions 222 are generally operative to facilitate determinations as to where RFID tags are located within a facility. Other functions of the RF enabled device 250 will become apparent as the discussion progresses.

The mobile reader 200 may also comprise a trigger which can be manually depressed to initiate tag read operations. The tag read operations can additionally or alternatively be performed automatically in accordance with a given application. The mobile reader 200 may further comprises a location device 274 for determining the location of the mobile reader within the RSF 128. An optional sensor(s) 276 can be provided to increase the accuracy of the determined location. The optional sensor(s) include, but are not limited to, a proximity sensor. The proximity sensor detects the distance from the mobile reader 200 to another object. The distance can be used to compute a more precise mobile reader location.

A compass 272 is provided to determine the pointing direction of the mobile reader 200 at the time of each tag read. As the mobile reader's 120 pointing direction and location are known at the time of an RFID tag read, the physical location of the RFID tag can be deduced, as discussed below. A location confidence value is computed for each physical location deduced for each tag involved. The location confidence value is computed based on the number of reads, an average Received Signal Strength Indicator ("RSSI"), a max RSSI, and/or the mobile reader's power level at the time of a tag read.

In some scenarios, the location confidence value is computed in accordance with the following mathematical equation (1).

$$CV = w_1 N + w_2 A + w_3 M + w_4 P \qquad (1)$$

where CV represents a location confidence value, N represents a number of reads, A represents an average RSSI, M represents a max RSSI, P represents the mobile reader's power level at the time of a tag read, and $w_1$-$w_4$ represent weighting values. The present solution is not limited to the particulars of this scenario.

Referring now to FIG. 3, there is provided an illustration that is useful for understanding how the mobile reader 200 can determine a tag's physical location within a facility (e.g., RSF 128 of FIG. 1). As shown in FIG. 3, the mobile reader 200 has an actual coverage area 302 at first RF power level $P_1$. Since the pointing direction of the mobile reader 200 is unknown, the mobile reader is considered to have a circular possible coverage area 304. Accordingly, any RFID tag 306 read by the mobile reader 200 while at a first location $L_1$ is determined to be somewhere within the circular possible coverage area 304, and not in its actual coverage area 302. This determination of the RFID tag's location is relatively inaccurate.

The accuracy of the RFID tag's location can be increased simply by decreasing the RF power level of the mobile reader from the first RF power level $P_1$ to a second RF power level $P_2$, as shown by FIG. 4. As shown in FIG. 4, the possible coverage area 408 is smaller than the possible coverage area 304.

The accuracy of the RFID tag's location can be further improved by knowing the mobile reader's pointing direction. In this regard, it should be understood that the mobile reader's actual coverage area 308 is also known. With this information, the RFID tag 306 read by the mobile reader 200 is determined to be somewhere within the actual coverage area 402, rather than in the much larger possible coverage area 406.

Figure 5:
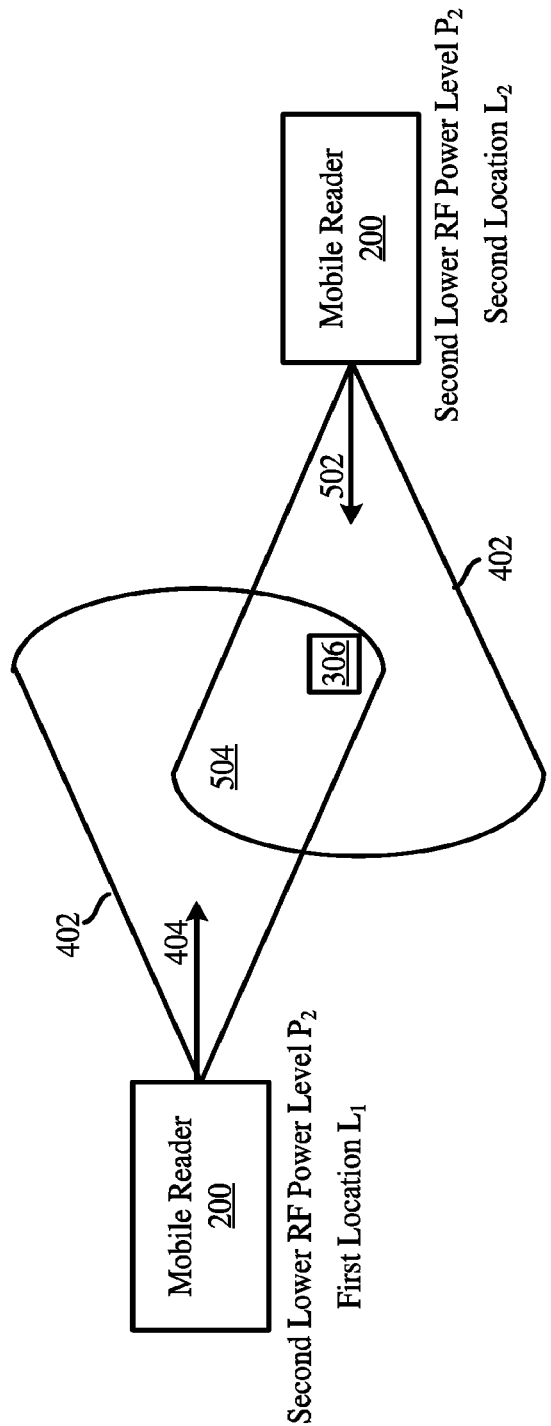
FIG. 5 is an illustration that is useful for understanding how a plurality of tag reads can be used to find a tag of interest.

Still, the accuracy of the RFID tag's location can be further improved using information from multiple tag reads. Referring now to FIG. 5, there is provided an illustration showing the mobile reader at a first location $L_1$ and a second location $L_2$ with the same RF power level $P_2$ setting. The mobile reader performs tag read operations at both locations while pointing in opposing directions 404, 502. Since the tag 306 was detected during both tag read processes, the location thereof is determined to be within the overlapping coverage area 504.

The accuracy of the tag's location can be further improved using an RSSI. For example, the mobile reader records a time window centered on a timestamp of each location $L_1$ and $L_2$. Then for each RFID tag, the timestamp of the read having the highest RSSI is used to retrieve the associated location $L_1$ or $L_2$ if it is included in a recorded time window. The tag's location is deduced from the mobile reader's associated location $L_1$ or $L_2$. The present solution is not limited to the particulars of this example.

Figure 6:
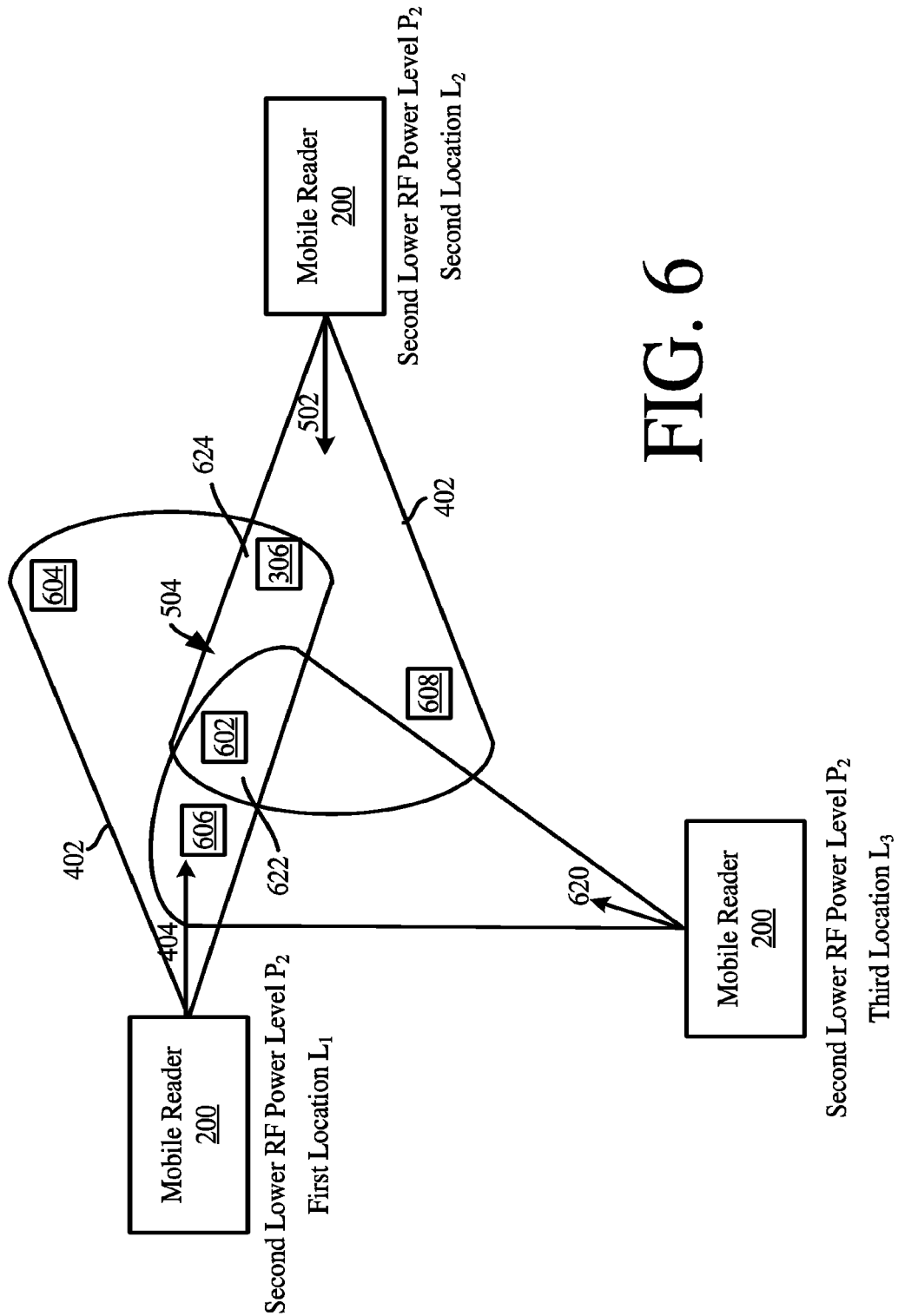
FIG. 6 is an illustration that is useful for understanding how read information for other tags can be used to increase an accuracy of a tag's location.

The accuracy of the tag's location can be further improved using tag read information for at least one other tag located in proximity thereto and/or coupled to an object/item of the same or similar type. Referring now to FIG. 6, there is an illustration that is useful for understanding a process for more accurately determining RFID tag location using read information for other tag(s). As shown in FIG. 6, the mobile reader 200 is shown at three different locations $L_1$, $L_2$ and $L_3$. The mobile reader 200 performs tag read operations at all three locations while having the same RF power level $P_2$ and different pointing directions 404, 502, 620. During the tag read operations at the first location $L_1$, four tags 306, 602-606 were detected. Three tags 306, 602, 608 were detected during the tag read operations at the second location $L_2$. Two tags 602, 606 was detected during the tag read operations at the third location $L_3$. The mobile reader's coverage areas at the first and second locations overlap in first area 504. The mobile reader's coverage area at the third location overlaps the overlapping coverage area 504 in second area 622. Since tag 306 was not detected during the tag read operations at the third location $L_3$, the location thereof is determined to be within area 624 of the overlapping coverage area 504, and not in area 622 of the overlapping coverage area 504.

The physical location of tag 306 can be adjusted or modified based on the physical locations of one or more of the other tags 602-606. For example, tags 606, 602 are coupled to objects similar to the object to which tag 306 is coupled. Such objects are supposed to be located in a particular area of the facility having a pre-defined overall size. If the distance between the physical locations of tags 602/306 and/or 606/306 exceeds a threshold value, then the physical location of tag 306 can be adjusted accordingly (e.g., a distance between two locations is decreased). The present solution is not limited to the particulars of this example.

Notably, location confidence values are determined for derived tag locations. Each location confidence value is computed based on the number of reads, an average RSSI, a maximum RSSI, and the mobile reader's power level used to read the RFID tags. The location confidence value for tag 306 is lower than the location confidence value for tag 602 at least since tag 306 was detected in only two of the three tag reads while tag 602 was detected in all three tag reads.

The location confidence value for tag 306 can be adjusted based on the locations of nearby tags with relatively high confidence values and/or associated object/item similarities. In this regard, the present solution involves: identifying first tags 602-606 located in proximity to a tag of interest 306; identifying second tags 602, 606 from the first tags 602-606 that are coupled to object/items which are similar to the object/item to which the tag of interest 306 is coupled; selecting one of the second tags 602 with the highest confidence value associated therewith; determining if the location of the tag of interest 306 is within a pre-defined distance range from the location of the selected tag 602; adjusting the location of the tag of interest 306 if it was determined that it was not within the pre-defined distance range from the location of the selected tag 602; and/or increasing the location confidence value for the tag of interest.

The tag locations and location confidence values can be determined by the mobile reader and/or by a remote computing device, such as server. A detailed block diagram of an exemplary architecture for a server 700 is provided in FIG. 7. Server 124 of FIG. 1 is the same as or substantially similar to server 700. As such, the following discussion of server 700 is sufficient for understanding server 124.

Figure 7:
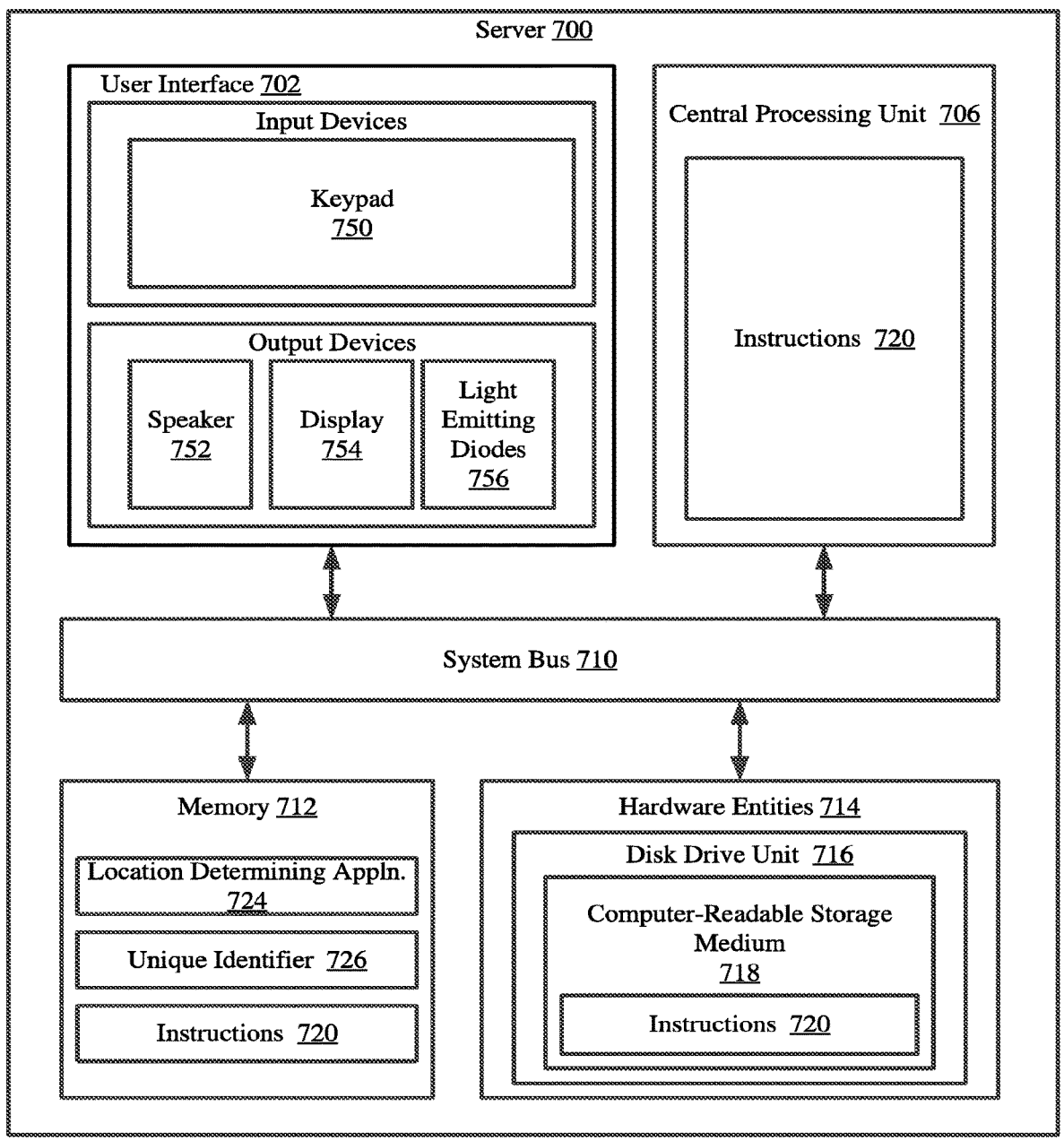
FIG. 7 is an illustration of an illustrative server.

Notably, the server 700 may include more or less components than those shown in FIG. 7. However, the components shown are sufficient to disclose an illustrative embodiment implementing the present solution. The hardware architecture of FIG. 7 represents one embodiment of a representative server configured to facilitate (a) tag location determinations, (b) tag location confidence value computations, and/or (c) the provision of a three dimensional map showing locations of RFID tags (e.g., RFID tags $112_1, \ldots, 112_N, 118_1, \ldots, 118_N$ of FIG. 1) within an RSF (e.g., RSF 128 of FIG. 1). As such, the server 700 of FIG. 7 implements at least a portion of the methods described herein.

Some or all the components of the server 700 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 7, the server 700 comprises a user interface 702, a Central Processing Unit ("CPU") 706, a system bus 710, a memory 712 connected to and accessible by other portions of server 700 through system bus 710, and hardware entities 714 connected to system bus 710. The user interface can include input devices (e.g., a keypad 750) and output devices (e.g., speaker 752, a display 754, and/or light emitting diodes 756), which facilitate user-software interactions for controlling operations of the server 700.

At least some of the hardware entities 714 perform actions involving access to and use of memory 712, which can be a RAM, a disk driver and/or a Compact Disc Read Only Memory ("CD-ROM"). Hardware entities 714 can include a disk drive unit 716 comprising a computer-readable storage medium 718 on which is stored one or more sets of instructions 720 (e.g., software code) configured to implement one or more of the methodologies, procedures, or functions described herein. The instructions 720 can also reside, completely or at least partially, within the memory 712 and/or within the CPU 706 during execution thereof by the server 700. The memory 712 and the CPU 706 also can constitute machine-readable media. The term "machine-readable media", as used here, refers to a single medium or multiple media (e.g., a centralized or distributed database, and/or associated caches and servers) that store the one or more sets of instructions 720. The term "machine-readable media", as used here, also refers to any medium that is capable of storing, encoding or carrying a set of instructions 720 for execution by the server 700 and that cause the server 700 to perform any one or more of the methodologies of the present disclosure.

In some scenarios, the hardware entities 714 include an electronic circuit (e.g., a processor) programmed for facilitating the provision of a three dimensional map showing locations of RFID tags within a facility. In this regard, it should be understood that the electronic circuit can access and run a location determining application 724 installed on the server 300. The software application 724 is generally operative to facilitate: the determination of RFID tag locations within a facility; and the mapping of the RFID tag locations in a virtual three dimensional space. The software application 724 is also operative to use product identification codes (e.g., tag SKU information) to group tags into product (e.g., SKU) areas; determine generic human readable names for the product (e.g., SKU) areas; and add visual lines and/or text to the map for visually showing product (e.g., SKU) areas. Other functions of the software application 724 will become apparent as the discussion progresses.

Figure 8:
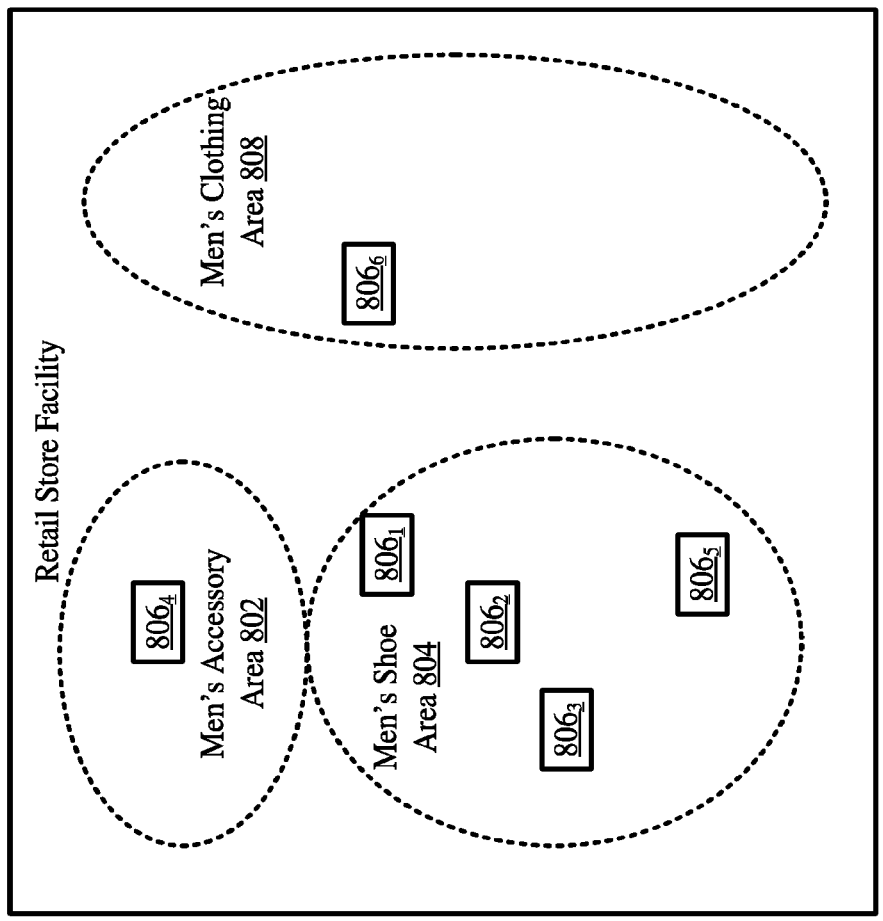
FIG. 8 is an illustration of an illustrative graphical map.

An illustration of an illustrative graphical map 800 is provided in FIG. 8. The map provides a 2D or 3D virtual representation of a retail store facility (e.g., RSF 128 of FIG. 1). The map includes dotted lines showing different areas 802, 804, 808 of the retail store facility into which a plurality of tags $806_1, \ldots, 806_6$ have been grouped. Text is also included on the map identifying the type of products contained in the respective areas. For example, area 802 has text which reads "Men's Accessory Area" associated therewith.

This feature of the present solution facilitates an automatic configuring of a store so that there is no need for installation of a fixed infrastructure and/or system calibration. In some scenarios, the present solution takes into account the product identification codes (e.g., SKU information) of the RFID tags being read in order to group them into product (e.g., SKU) areas. Then, the product (e.g., SKU) area information is used to assign a human readable name to the location of a group of tags. This would involve transforming a tag read into a textual name (e.g., Men's Shoes Size 7). A determination is then made that most of the tags near the read tag are coupled to men's shoes of various sizes. This information is then displayed on the map and stored in a data store (e.g., data store 126 of FIG. 1, memory 204 of FIG. 2, and/or memory 712 of FIG. 7). There is no need for an employee to edit data or add labels and text to the map. This would be done automatically by software and displayed to the customer or employee when (s)he viewed the inventory on the map. This same type of logic could be used to map out an entire store so that when someone wants to go from their current location to a specific spot in a store, all of the product identification codes (e.g., SKUs) read could be used to direct their motion through the store without configuring anything manually.

Illustrative Methods for Locating an RF Enabled-Device in a Facility

Figure 9A:
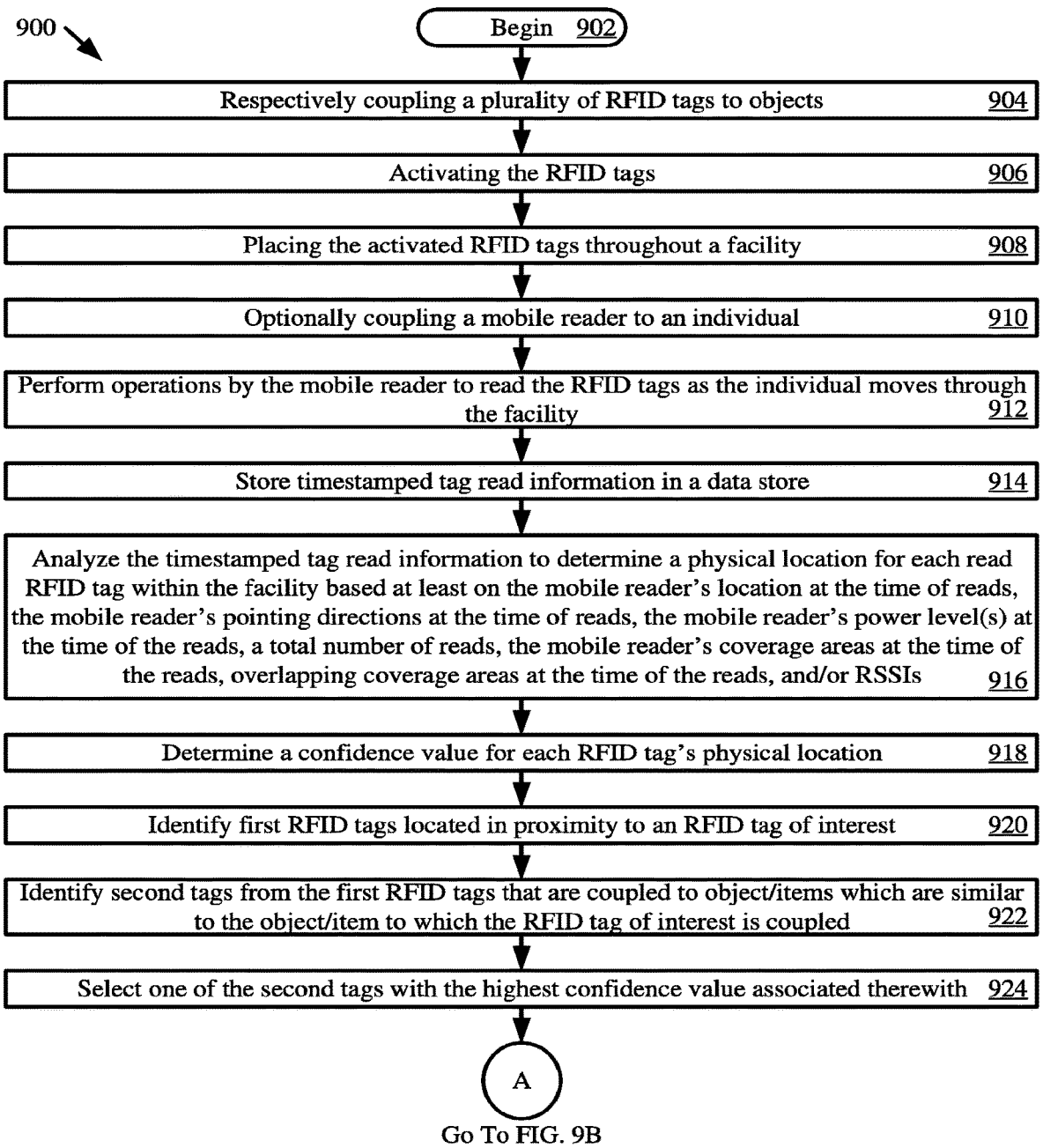
FIGS. 9A-9B (collectively referred to as "FIG. 9") is a flow diagram of an illustrative method for determining physical locations of RFID tags in a facility.

Referring now to FIG. 9, there is provided a flow diagram of an illustrative method for determining physical locations of RFID tags in a facility. As shown in FIG. 9A, method 900 begins with 902 and continues with 904 where a plurality of RFID tags (e.g., RFID tags $112_1$-$112_N$, $118_1$-$118_X$ of FIG. 1, RFID tag 306 of FIGS. 3-6, RFID tags 602-606 of FIG. 6) are respectively coupled to objects (e.g., objects (or items) $110_1$-$110_N$, $116_1$-$116_X$ of FIG. 1). Next in 906-908, the RFID tags are activated and placed throughout a facility (e.g., RSF 128 of FIG. 1).

Thereafter in 910, a mobile reader (e.g., mobile reader 120 of FIG. 1) is optionally coupled to an individual (e.g., employee 122 of FIG. 1). The mobile reader then performs operations in 912 to read the RFID tags as the individual moves through the facility. Accordingly, multiple tag reads are performed by the mobile reader at different locations within the facility (e.g., locations $L_1$, $L_2$, $L_3$ of FIG. 6). The mobile reader may have the same or different RF power level setting at each location.

Timestamped tag reader information is stored in a data store (e.g., data store 126 of FIG. 1, memory 204 of FIG. 2, and/or memory 712 of FIG. 7), as shown by 914. The timestamped tag reader information is analyzed in 916 to determine a physical location for each read RFID tag within the facility. The physical location is determined based on at least one of the following: the mobile reader's location at the time of reads; the mobile reader's pointing directions at the time of reads; the mobile reader's power level(s) at the time of the reads; a total number of reads (e.g., so that an average of a plurality of physical locations can be determined); the mobile reader's coverage areas at the time of the reads; overlapping coverage areas at the time of the reads; and/or RSSIs. The analysis of 916 can be performed by the mobile reader and/or a remote device (e.g., server 124 of FIG. 1).

A location confidence value is then determined for each of the determined physical locations, as shown by 918. The location confidence value is determined based on the number of reads in which the respective tag was detected, an average RSSI, a max RSSI, and/or the mobile reader's power level(s) at the time of the tag reads. The location confidence value can be determined by the mobile reader and/or a remote device (e.g., server 124 of FIG. 1).

In next 920, first RFID tags (e.g., tags 602-608 of FIG. 6) are identified. The first RFID tags include those RFID tags of the plurality of RFID tags which are located in proximity to an RFID tag of interest (e.g., tag 306 of FIG. 6). In some scenarios, a pre-defined maximum distance (e.g., 1-20 feet) can be used to determine which tags are in proximity to the RFID tag of interest.

Second RFID tags are then identified in 922 from the first RFID tags. The second RFID tags (e.g., tags 602 and 606 of FIG. 6) include those tags that are coupled to objects/items which are similar to the object/item to which the RFID tag of interest is coupled. One of the second RFID tags (e.g., tag tags 602 of FIG. 6) is selected with the highest location confidence value associated therewith, as shown by 924. Thereafter, method 900 continues with 926 of FIG. 9B.

Figure 9B:
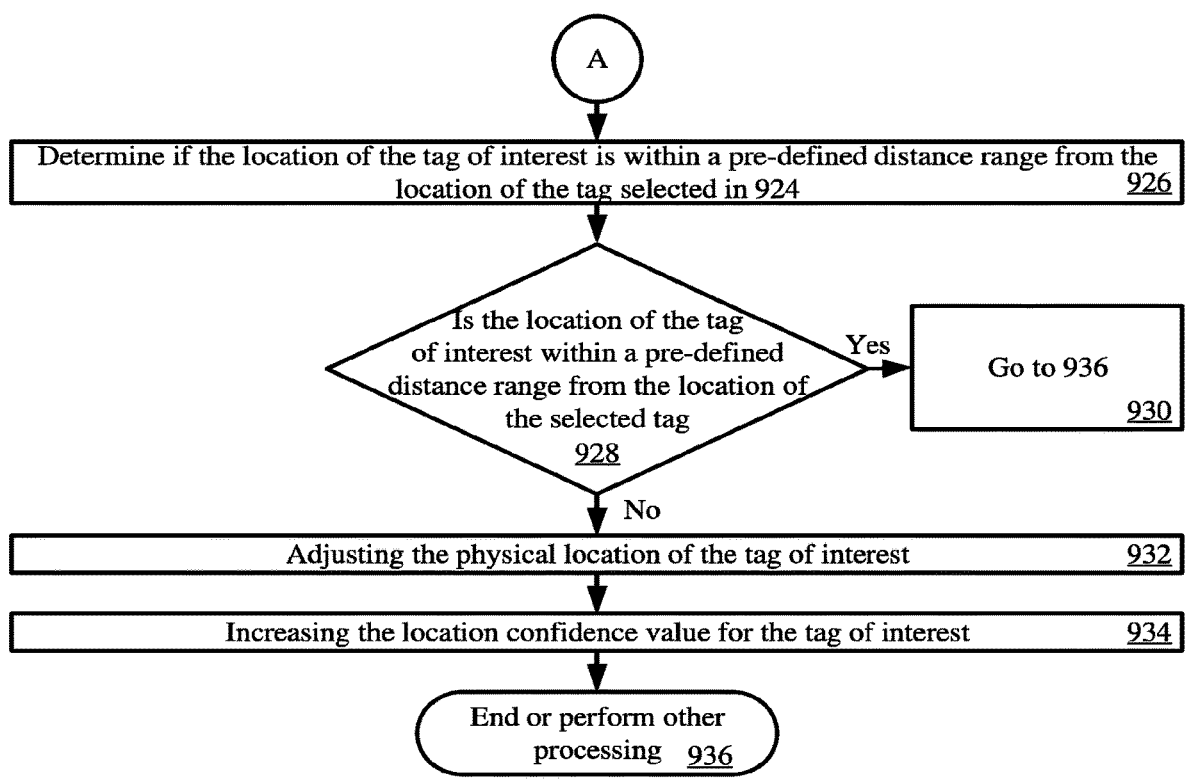

As shown in FIG. 9B, 926 involves determining if the physical location of the tag of interest is within a pre-defined distance range from the location of the tag selected in 924. If so [928:YES], then 930 is performed where method 900 goes to 936. If not [928:NO], then 932 is performed where the physical location of the tag of interest is adjusted. For example, the physical location can be adjusted to fall within the pre-defined distance range.

Additionally in 934, the location confidence value for the tag of interest is also increased. The location confidence value is increased by a pre-defined amount or an amount selected based on (a) how much the physical location was adjusted, (b) the location confidence value associated with the tag selected in 924, and/or (c) a degree of similarity between an object to which the tag of interest is coupled and an object to which the tag selected in 924 is coupled. For example, the physical location is moved 0.5 feet in a direction towards the tag selected in 924, and the location confidence value associated with the tag selected in 924 is 85%. In this case, the location confidence value is increased by 10% (i.e., from 65% to 75%) in accordance with pre-defined rules and/or information contained in a pre-defined look-up table. The present solution is not limited to the particulars of this example. Subsequently, 936 is performed where method 900 ends or other processing is performed.

Figure 10:
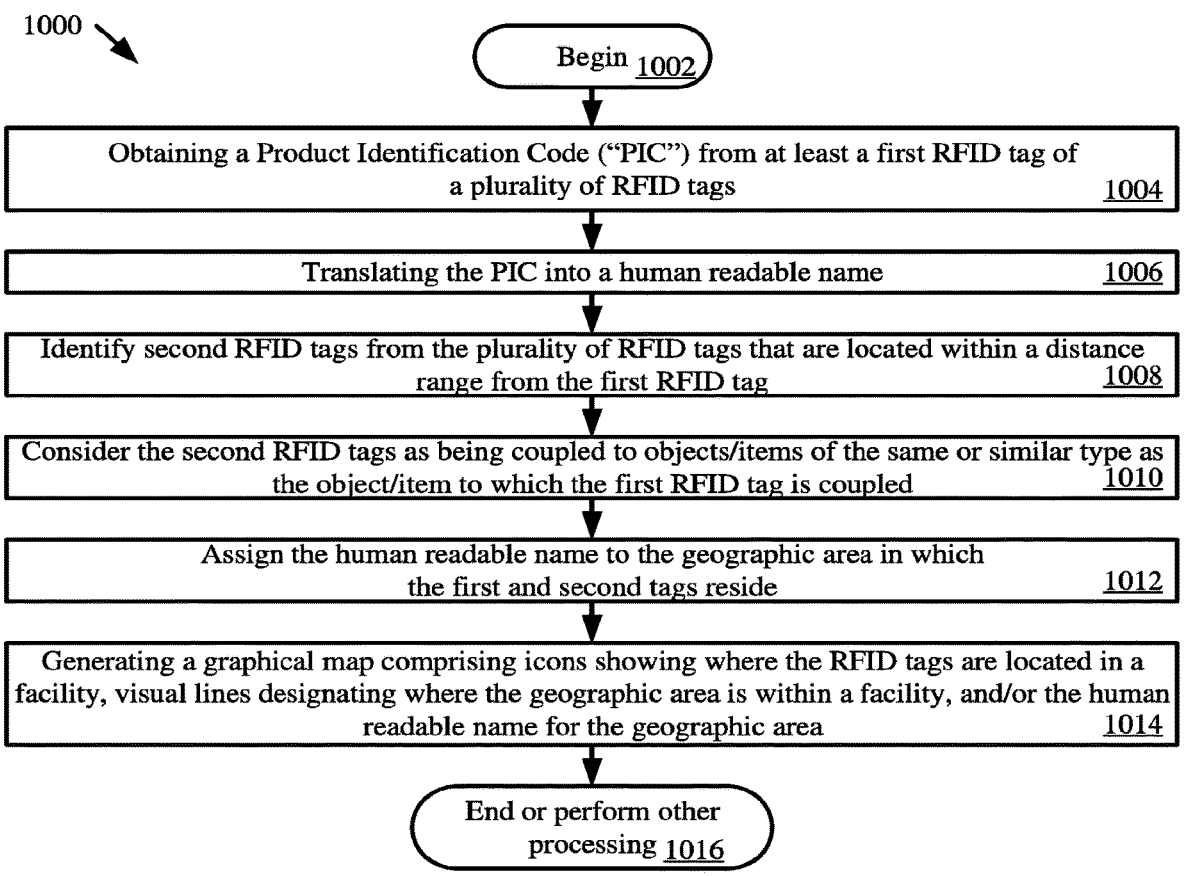
FIG. 10 is a flow diagram of an illustrative method for generating a graphical map.

Referring now to FIG. 10, there is provided a flow diagram of an illustrative method 1000 for generating a graphical map (e.g., graphical map 800 of FIG. 8). The operations of method 1000 can be performed by the mobile reader and/or a remote device (e.g., server 124 of FIG. 1).

Method 1000 begins with 1002 and continues with 1004 where a product identification code (e.g., a SKU number) is obtained from at least a first RFID tag of a plurality of RFID tags (e.g., RFID tags 112$_1$-112$_N$, 118$_1$-118$_X$ of FIG. 1, RFID tag 306 of FIGS. 3-6, RFID tags 602-606 of FIG. 6). In next 1006, the product identification code is translated into a human readable name (e.g., Men's Shoes). This translation can involve: accessing a data store (e.g., data store 126 of FIG. 1) to obtain information specifying the type of product the tag is coupled to as well the size of the product; and deriving a generic product name based on the obtained information, pre-defined rules, and/or information contained in a look-up table.

Second RFID tags are identified from the plurality of RFID tags in 1008. The second RFID tags include those tags that are located within a distance range from the first RFID tag. The second RFID tags are considered as being coupled to objects/items of the same or similar type as the object/item to which the first RFID tag is coupled, as shown by 1010.

In 1012, the human readable name is assigned to the geographic area in which the first and second tags reside. The graphical map is then generated in 1014. The graphical map comprises (a) icons showing where the RFID tags are located in a facility (e.g., RSF 128 of FIG. 1), (b) visual lines designating where the geographical area is within a facility, and/or (c) the human readable name for the geographic area. Subsequently, 1016 is performed where method 1000 ends or other processing is being performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for determining a physical location of a first Radio Frequency Identification ("RFID") tag, comprising:
    determining a first physical location for the first RFID tag read by an RFID tag reader;
    identifying second RFID tags from a plurality of RFID tags read by the RFID tag reader that are located in proximity to the first RFID tag and that are coupled to objects similar to an object to which the first RFID tag is coupled;
    selecting an RFID tag from the second RFID tags that has a first location confidence value associated therewith which is greater than location confidence values associated with other RFID tags of the second RFID tags; and
    modifying the first physical location based on a second physical location of the RFID tag selected from the second RFID tags.

2. The method according to claim 1, further comprising increasing a third location confidence value associated with the first RFID tag by an amount selected based on at least one of (a) how much the first physical location was modified, (b) the first location confidence value associated with the RFID tag selected from the second RFID tags, and (c) a degree of similarity between an object to which the first RFID tag is coupled and an object to which the RFID tag selected from the second RFID tags is coupled.

3. The method according to claim 1, further comprising generating a graphical map showing the first physical location of the first RFID tag in a virtual space.

4. The method according to claim 3, wherein the graphical map comprises a human readable name for a geographic area in which the first RFID tag resides.

5. The method according to claim 4, wherein the human readable name is determined by translating a read product identification code into the human readable name.

6. The method according to claim 5, wherein the translating is performed by the RFID tag reader without any manual input from a user.

7. A system, comprising:
a processor; and
a non-transitory computer-readable storage medium comprising programming instructions that are configured to cause the processor to implement a method for determining a physical location of a first Radio Frequency Identification ("RFID") tag, wherein the programming instructions comprise instructions to:
determine a first physical location for the first RFID tag read by an RFID tag reader;
identify second RFID tags from a plurality of RFID tags read by the RFID tag reader that are located in proximity to the first RFID tag and that are coupled to objects similar to an object to which the first RFID tag is coupled;
select an RFID tag from the second RFID tags that has a first location confidence value associated therewith which is greater than location confidence values associated with other RFID tags of the second RFID tags; and
modify the first physical location based on a second physical location of the RFID tag selected from the second RFID tags.

8. The system according to claim 7, wherein the programming instructions are further configured to cause the processor to increase a third location confidence value associated with the first RFID by an amount selected based on at least one of (a) how much the first physical location was modified, (b) the first location confidence value associated with the RFID tag selected from the second RFID tags, and (c) a degree of similarity between an object to which the first RFID tag is coupled and an object to which the RFID tag selected from the second RFID tags is coupled.

9. The system according to claim 7, wherein the programming instructions are further configured to cause the processor to generate a graphical map showing the first physical location of the first RFID tag in a virtual space representing a facility.

10. The system according to claim 9, wherein the graphical map comprises a human readable name for a geographic area in which the first RFID tag resides.

11. The system according to claim 10, wherein the human readable name is determined by translating a read product identification code into the human readable name.

12. The system according to claim 11, wherein the translating is performed by the RFID tag reader without any manual input from a user.

13. Non-transitory computer readable storage media storing thereon instructions that when executing by one or more processors are operative to:
determine a first physical location for a first RFID tag read by an RFID tag reader;
identify second RFID tags from a plurality of RFID tags read by the RFID tag reader that are located in proximity to the first RFID tag and that are coupled to objects similar to an object to which the first RFID tag is coupled;
select an RFID tag from the second RFID tags that has a first location confidence value associated therewith which is greater than location confidence values associated with other RFID tags of the second RFID tags; and
modify the first physical location based on a second physical location of the RFID tag selected from the second RFID tags.

14. The non-transitory computer readable storage media storing thereon instructions according to claim 13, further comprising increasing a third location confidence value associated with the first RFID by an amount selected based on at least one of (a) how much the first physical location was modified, (b) the first location confidence value associated with the RFID tag selected from the second RFID tags, and (c) a degree of similarity between an object to which the first RFID tag is coupled and an object to which the RFID tag selected from the second RFID tags is coupled.

15. The media according to claim 13, further comprising generating a graphical map showing the first physical location of the first RFID tag in a virtual space.

16. The media according to claim 15, wherein the graphical map comprises a human readable name for a geographic area in which the first RFID tag resides.

17. The media according to claim 16, wherein the human readable name is determined by translating a read product identification code into the human readable name.

18. The media according to claim 17, wherein the translating is performed by the RFID tag reader without any manual input from a user.

* * * * *